Dec. 18, 1962   R. L. SMIRL   3,068,980
CLUTCH ANTI-SPIN DEVICE
Filed March 24, 1961
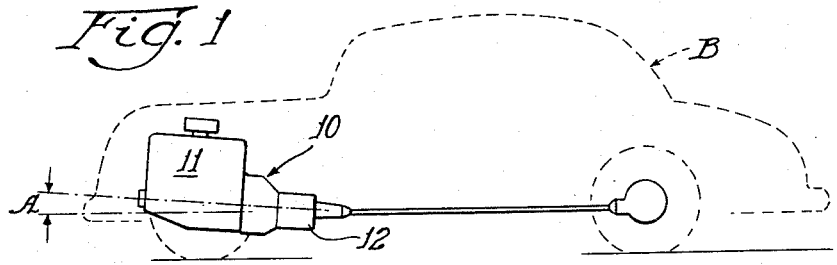
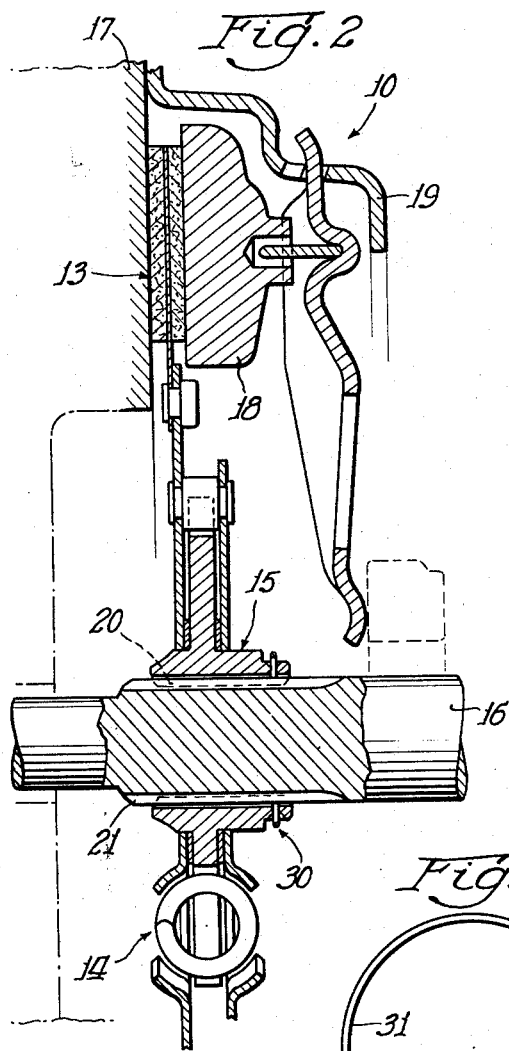
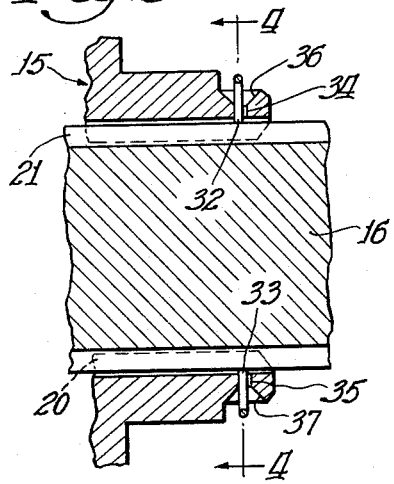
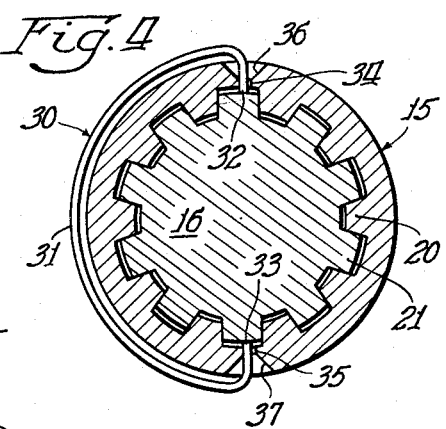
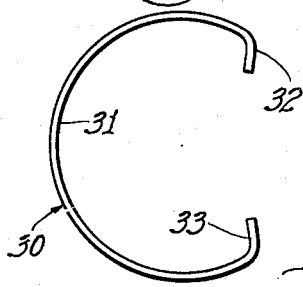
Inventor:
Richard L. Smirl
By: Joseph W. Malleck

3,068,980
CLUTCH ANTI-SPIN DEVICE
Richard L. Smirl, La Grange Park, Ill., assignor to Borg-Warner Corporation, Chicago, Ill., a corporation of Illinois
Filed Mar. 24, 1961, Ser. No. 98,044
2 Claims. (Cl. 192—110)

This invention relates to clutches and more particularly to a device in a clutch mechanism used to prevent unwanted spin of the clutch driven plate when it slides into engagement with driven members of the clutch during the disengaged clutch condition.

In automotive vehicles, the engine, clutch and transmission assembly are normally disposed at an angle with respect to a horizontal plane. Since the trend in modern vehicles has been toward lower silhouettes, the tilt of the engine clutch and transmission has been greatly increased in order to lower the hump that is provided in the vehicle floor board to accommodate the drive shaft.

This increased angle of disposition has serious effects on the proper operation of clutches which employ freely slidable friction-type driven plates. The friction clutch driven plate is normally splined to the input shaft of the transmission, and in a disengaged condition of the clutch its weight tends to cause it to slide axially along the splines of the transmission input shaft. The pressure plate for the clutch is ordinarily fastened to the engine flywheel assembly and when the clutch driven plate comes in contact with the pressure plate, the frictional contact causes the driven plate to spin. The friction driven plate, in turn, causes the input shaft to the transmission to spin, which causes gear clash when a countershaft transmission is shifted into one of its unsynchronized gear ratio positions (including low and reverse) prior to engaging the clutch. The device of the present invention is designed to inhibit axial sliding of the friction driven plate when the clutch is disengaged for thereby preventing free spin of the clutch driven plate and transmission input shaft.

It is an object of the present invention to provide an economical resilient device attached to a friction driven plate of a clutch mechanism and effective to exert a limited holding force on the driven plate for inhibiting its axial motion along the transmission input shaft.

It is a more particular object to provide a clutch mechanism including a friction driven plate splined to an input shaft of a transmission and a spring device carried by the friction driven plate and effective to exert a limited holding force on the shaft for inhibiting axial motion of the friction driven plate along the shaft when the clutch is disengaged.

It is a still more particular object to provide a spring device mounted on a clutch driven plate that is splined to an input shaft of a transmission, the device including an integral substantially semi-circular resilient body member having two radial inwardly extending end portions which exert a gripping force on the shaft to inhibit the friction driven plate from sliding along the input shaft.

The invention consists of the novel constructions, arrangements, and devices to be hereinafter described and claimed for carrying out the above-stated objects and such other objects as will appear from the following description of a preferred form of the invention, illustrated with reference to the accompanying drawings, wherein:

FIG. 1 is a schematic view of an automotive vehicle illustrating the general disposition of a clutch mechanism incorporating this invention;

FIG. 2 is a longitudinal sectional view of a clutch construction and embodying the features of the present invention;

FIG. 3 is an enlarged fragmentary view of FIG. 2;

FIG. 4 is a view taken on line 4—4 of FIG. 3; and

FIG. 5 is a view of the anti-slip spring in a relaxed condition.

Like characters of reference designate like parts in the several views.

Referring to FIG. 1, there is illustrated a schematic view of an automotive vehicle B in which is installed a clutch 10, interconnected with a driving engine 11 and a countershaft transmission 12. The engine, clutch and transmission are disposed in line and at an angle with a horizontal plane designated by "A" on the figure. The clutch mechanism 10 comprises a friction driven plate 13, a vibration damper assembly 14, and a central hub 15, splined to an input shaft 16 of the transmission. The clutch mechanism 10 also includes a flywheel assembly 17 adapted to be driven by the crank-shaft of the engine 11, a pressure plate 18, and a housing 19 bolted to the flywheel 17. The pressure plate 18 is adapted to press the friction disc 13 into engagement with the flywheel 17. The hub 15 is formed with splines 20 on the interior thereof adapted to mesh with splines 21 formed on the shaft 16.

When the clutch 10 is disengaged, the weight component of the friction driven plate 13 that is parallel to the shaft 16 tends to force it downwardly along the shaft 16. If the clutch driven plate 13 were permitted to slide axially, it would contact the pressure plate 18; and the frictional contact therewith would set the clutch driven plate 13 and input shaft 16 into rotation. Such rotation would cause gear clash when the transmission 12 is shifted into an unsynchronized gear prior to clutch engagement.

Referring to FIGS. 3–5, there is illustrated an enlarged sectional view of a portion of FIG. 2 including a spring 30. The spring 30 comprises a substantially semi-circular body portion 31 and two radial inwardly extending ends 32 and 33. As shown, the spring is preferably formed of resilient steel wire. The hub 15 is formed with two substantially radial holes 34 and 35 for receiving the ends 32 and 33, respectively, of the spring 30. The holes 34 and 35 are countersunk at 36 and 37, respectively, to facilitate assembly of the spring on the hub 15. The only free sliding or rotating movement that may take place between the shaft 16 and hub 15 is the looseness that is provided for between the diameter of the spring wire and the diameter of the holes 34 and 35.

In a stressed condition, as shown in FIG. 4, the spring 30 is substantially semi-circular, but in a relaxed condition, as shown in FIG. 5, it subtends a larger arc of a circle of smaller diameter. The ends 32 and 33 of the spring 30, in a stressed condition, extend through the holes 34 and 35 and exert a radial inward force against the splines 21 of the shaft 16. The force exerted by the spring 30 is not sufficient to prevent the hub 15 from sliding axially along the inclined shaft 16 when the pressure plate 18 of the clutch 10 is positively moved against the driven plate 13.

There has been provided by this invention a resilient device of low cost and simple construction that is effective to prevent free spin of the clutch driven plate due to frictional contact with the clutch pressure plate when the cluch is in a disengaged position.

It is to be understood that the invention is not to be limited to the specific constructions and arrangements shown and described, except only insofar as the claims may be so limited, as it will be understood by those skilled in the art that changes may be made without departing from the principles of the invention.

What is claimed is:

1. In a clutch construction adapted to be used with a transmission having an input shaft normally disposed at an angle with respect to a horizontal plane, the combination of a friction driven plate having a central hub with a sleeve thereof splined to the transmission input shaft, and spring means mounted about the exterior of said hub sleeve and having opposed resilient portions extending to the interior of the sleeve for contacting said shaft for inhibiting axial motion of said friction driven plate due to its weight along said shaft.

2. In a clutch mechanism adapted to be used with a transmission mechanism having an input shaft normally disposed at an angle with respect to a horizontal plane, the combination of a friction driven plate, a central hub splined to the input shaft and carrying said friction driven plate, and a spring device comprising a substantially semi-circular resilient body portion and two radially inward extending end portions, said spring device being carried by said hub, said hub being formed with radially extending holes therethrough for receiving said end portions and said end portions contacting the input shaft, whereby said resilient device is effective to exert a holding force for inhibiting axial motion of said hub along the shaft.

References Cited in the file of this patent

UNITED STATES PATENTS 2,236,652   Shurts et al. _____ Apr. 1, 1941